Oct. 25, 1932.  F. F. ZEIER  1,884,487
FEEDING MECHANISM FOR SEWING MACHINES
Filed June 26, 1928   2 Sheets-Sheet 1
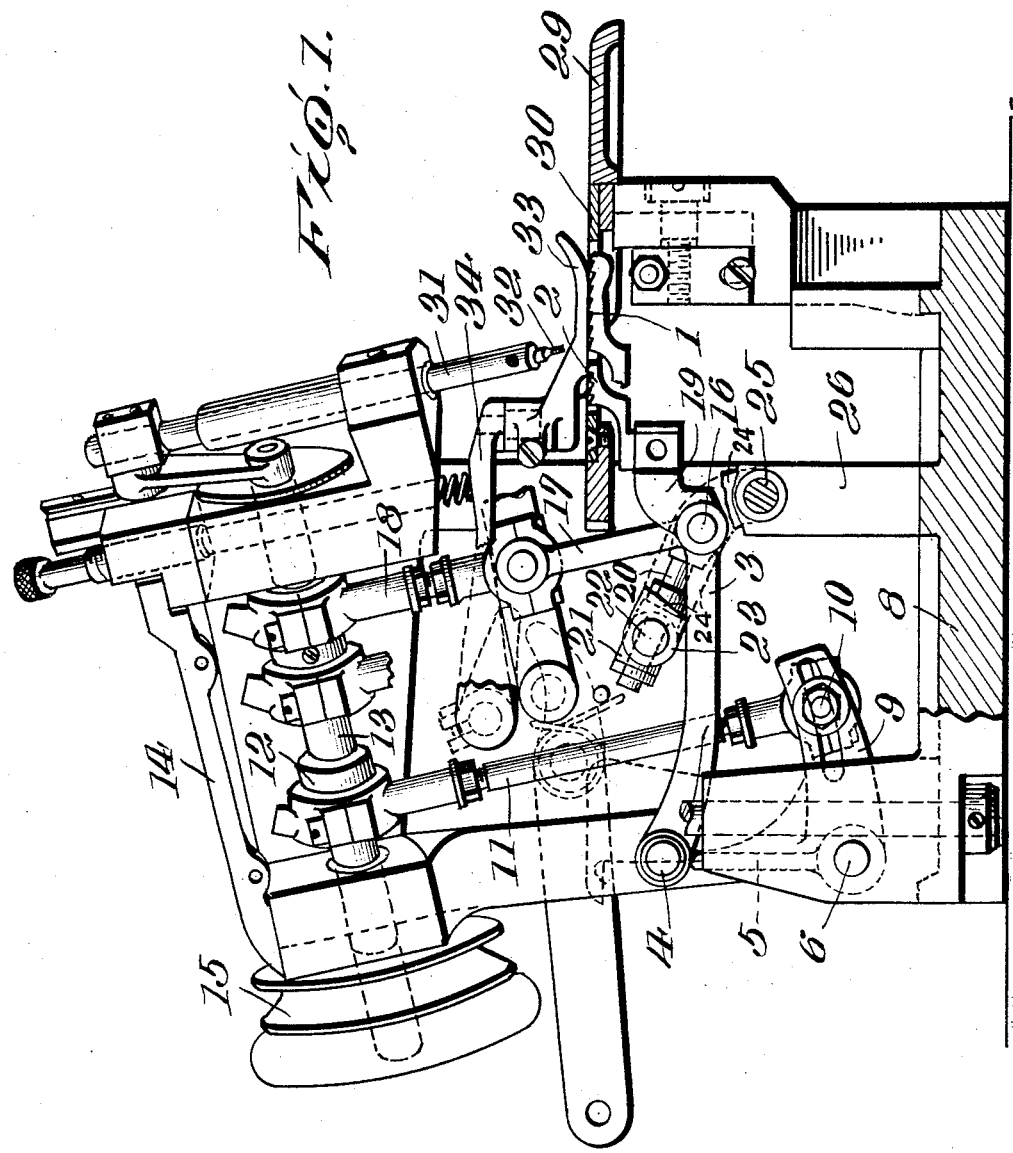
Inventor
Frederick F. Zeier
By Sturtevant & Mason
Attorney

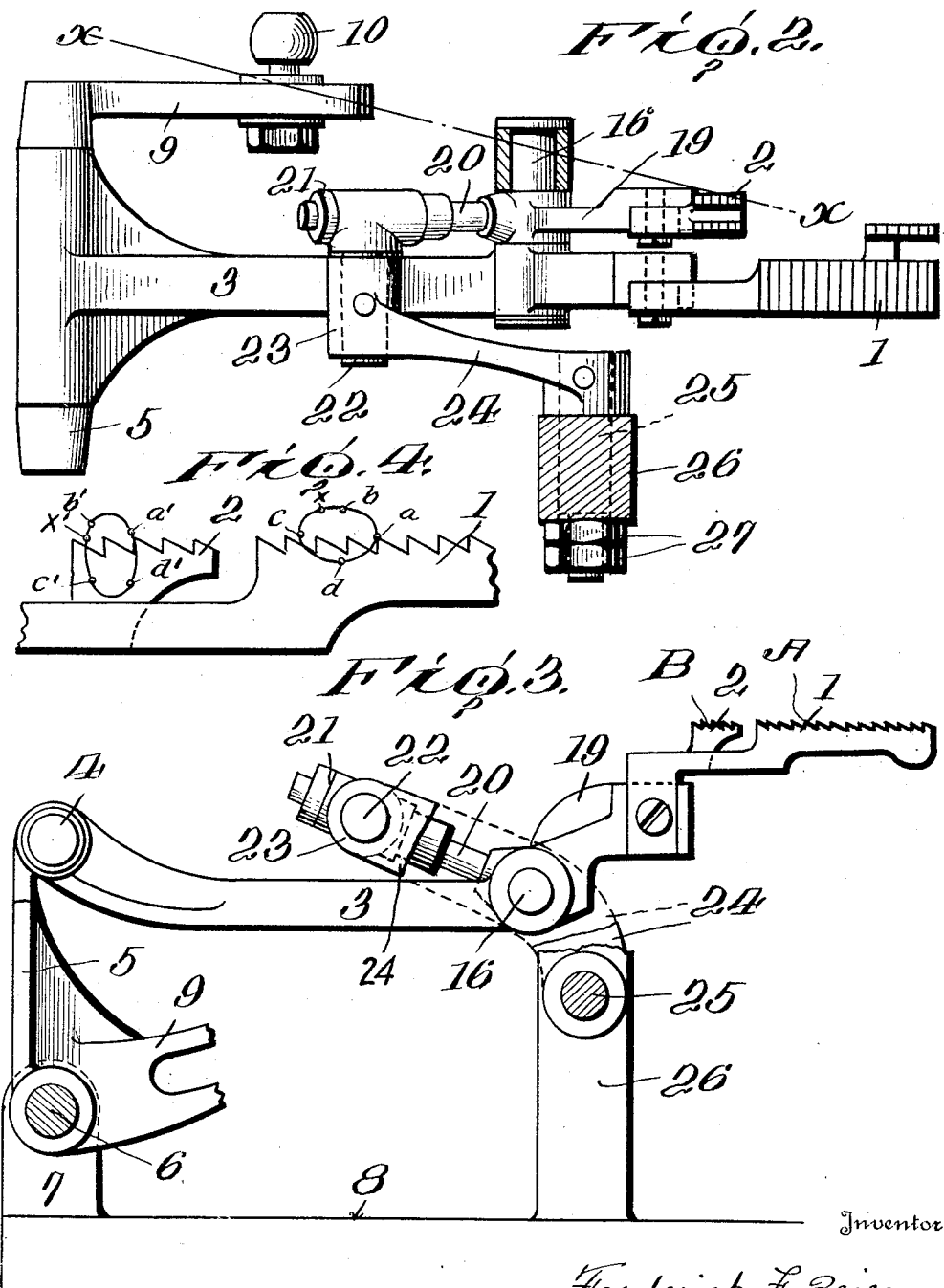

Patented Oct. 25, 1932

1,884,487

UNITED STATES PATENT OFFICE

FREDERICK F. ZEIER, OF CHICAGO, ILLINOIS, ASSIGNOR TO UNION SPECIAL MACHINE COMPANY, OF CHICAGO, ILLINOIS, A CORPORATION OF ILLINOIS

FEEDING MECHANISM FOR SEWING MACHINES

Application filed June 26, 1928. Serial No. 288,419.

The invention relates to new and useful improvements in feeding mechanisms for sewing machines, and more particularly to a feeding mechanism having two feed dogs which may be given a differential feeding movement.

An object of the invention is to provide a feeding mechanism having a feed rocker and a feed bar connected thereto and carrying the feed dogs wherein the feed rocker may be oscillated and the feed bar raised and lowered by connections with an actuating shaft arranged above the feed bar and extending in a direction at an inclination to the line of feed, and wherein said feed dogs are given a differential up and down movement by devices actuated by the up and down movement of the feed bar.

A further object of the invention is to provide a feeding mechanism having feed dogs carried by a single feed bar wherein said feed dogs are given a differential up and down movement by devices actuated by the up and down movement of the feed bar, and a cooperating guiding member, the position of which may be adjusted for varying the differential movement.

These and other objects will in part be obvious and will in part be hereinafter more fully disclosed.

In the drawings which show by way of illustration one embodiment of the invention:—

Fig. 1 is a vertical sectional view through a machine embodying the improvements.

Fig. 2 is a view of a portion of the machine showing the feeding mechanism partly in plan and partly in section.

Fig. 3 is a view partly in section and partly in side elevation showing a portion of the feeding mechanism.

Fig. 4 is an enlarged view of portions of the feed dogs showing the path of movement of the same.

The invention is directed to improvements in a feeding mechanism for sewing machines and more particularly to a feeding mechanism which is capable of imparting differential feeding movements to a fabric section being stitched. The feeding mechanism includes two feed dogs which are in part at least arranged in tandem. Both of the feed dogs are carried by the same feed bar. The feed bar is moved back and forth by an oscillating feed rocker and the end of the feed bar carrying the feed dogs is raised and lowered by a connection to the feed bar adjacent the free end of the feed bar. One of the feed dogs is rigidly attached to said feed bar; the other feed dog is rigidly attached to a lever, which, in turn, is pivoted to the feed bar. Both the feed dogs are raised and lowered when the feed bar is raised and lowered. The lever has an extended arm which passes through a guide and the arm slides back and forth in the guide during the feeding movement of the feed bar. This guide is pivotally supported by a stationary member and during the up and down movement of the feed bar the guide will act on the lever carrying the auxiliary feed dog so as to impart an additional movement thereto. It is through this cooperation of the guide and the actuating lever that the feed dogs have imparted thereto a differential up and down movement. By shifting the position of the guide relative to the feed bar the amount of differential movement imparted to the feed dogs may be varied.

Referring more in detail to the drawings, the mechanism is shown as including a feed dog 1 disposed so as to operate upon the material being stitched in part in advance of the needle, and a feed dog 2 which operates upon the material being stitched wholly in rear of the needle. The feed dog 1 is fixed to a feed bar 3 by suitable means whereby it may be vertically adjusted. The feed bar 3 is pivoted at 4 to a feed rocker 5. The feed rocker 5 is, in turn, mounted for oscillation about an axis 6 on supporting lugs 7 carried by the bed 8 of the machine. The feed rocker is provided with a forwardly projecting arm 9, and a stud 10, having a ball head on the end thereof, is capable of being shifted in the slotted arm 9 and set in various adjusted positions therein. Cooperating with the ball head on the stud 10 is an eccentric strap 11 which cooperates with an eccentric 12 on a main shaft 13 mounted for rotation in an overhanging arm 14. This shaft 13 is driven by a belt wheel 15.

The feed bar is raised and lowered by means of a projecting shaft 16. This shaft 16 is connected to a link 17 which link has a connection with an eccentric strap 18 cooperating with an eccentric on the main shaft 13. The shaft 13 is positioned relative to the feeding mechanism so that the axis of the shaft is inclined to the line of feed. The axis of the actuating shaft is indicated by the line $x-x$ in Fig. 2. This arrangement of the actuating shaft to the line of feed and the operation of the feed bar by these eccentric straps which are directly connected to the shaft is shown described and claimed in the application filed jointly by Norman V. Christensen and myself, April 16, 1928, Serial Number 270,446. The means for giving the feed dogs the differential up and down movement is my sole invention, and is described and claimed in this application.

The feed dog 2 is attached to a lever 19. This lever 19 is mounted on the shaft 16 and oscillates freely thereon. The lever 19 is provided with a rearwardly projecting cylindrical arm 20. This cylindrical arm extends through a guide sleeve 21. The guide sleeve 21 is fixed to a shaft 22 which is mounted for free oscillation in a sleeve 23 fixed to the outer end of an arm 24. The arm 24 is in turn, fixed to a shaft 25 which is mounted in a bearing lug 26 carried by the bed 8. The shaft 25 is secured to the bearing lug by means of clamping nuts 27.

The feed bar moves freely back and forth when the feed rocker is oscillated. At this time the cylindrical rod 20 slides in the guiding sleeves and possibly produces a slight rocking of the lever carrying the feed dog 2. This is not sufficient, however, to in any way overcome the differential rising and falling movement imparted to the feed dog 2 by the up and down movements of the feed bar. When the feed bar moves upwardly the guide-sleeve will be rotated about the center of the shaft 22 and this will swing the lever carrying the feed dog. The feed dog 2 when the feed bar is moved upwardly partakes of all of the up and down movements of the shaft 16 on which the lever carrying the feed dog is mounted. It also partakes of an additional up and down movement due to the swinging of the lever. When the feed bar moves upwardly the lever will be swung in a counter-clockwise direction and this will add to the upward movement of the feed dog 2. Thus it is that the feed dog 2 is raised to a greater extent than the feed dog 1, and all of these movements are derived from the common up and down movement given to the feed bar carrying the feed dogs. When the feed bar is lowered the reverse action takes place and the feed dog 2 will be given a downward movement which exceeds the downward movement of the feed dog 1. In Fig. 4 of the drawings I have illustrated the path of movement of a point in the feed dog 1 and also the path of movement of a point in the feed dog 2. Four positions of the movement of the point in the feed dog 1 are indicated at $a$, $b$, $c$ and $d$, and four similar positions of the movement of the point in the feed dog 2—2 are indicated at $a'$, $b'$, $c'$, and $d'$. It will be noted that the path of travel of the point in the feed dog 1 is elliptical with the major axis substantially horizontal, while the path of travel of the point in the feed dog 2 is elliptical with the major axis inclined slightly rearwardly from the vertical. This difference in the path of travel of the points in the two feed dogs is brought about by this added upward movement which is imparted to the feed dog 2 through the swinging of the lever on which it is mounted. The feed dogs may be adjusted on their respective feed bars so that the points referred to on their upward movement will cross the plane of the work support substantially at the same time. When the points simultaneously cross the plane of the throat plate the feed dogs will engage the fabric section at the same time. If it were not for the pivotal swinging of the lever carrying the feed dog 2 the points referred to would cross the plane of the throat plate at the same time on their downward movement. The fact that the feed dog 2 is raised to a greater extent than the feed dog 1 would not alter the effective feeding movement imparted to the fabric by the feed dogs, and the fabric sections would be fed uniformly by both feed dogs. If the feed dog 2 be lowered in its path of travel so that the feed dog 1 will cross the plane of the throat plate at an earlier period than the feed dog 2, then the feed dog 2 will also cross the plane of the throat plate at an earlier period on its downward movement.

Referring to Fig. 4, the point marked $x'$ on the path of travel of the feed dog 2 indicates a point at which said feed dog crosses the plane of the throat plate, while the point marked $x$ on the path of the feed dog 1 indicates its position at the time when the feed dog 2 crosses the plane of the throat plate. Thus it will be seen that while the feed dog 2 is moving from the point $x'$ to the point $c'$, the feed dog 1 is moving from the point $x$ to the point $c$ and in this movement is still imparting feeding movements to the fabric. The feed dog 1, therefore, is in engagement with the fabric a greater length of time than the feed dog 2, and this is what produces a differential feeding of the fabric; that is, a feeding of the fabric to the needle a little faster than it is taken away from the needle.

Under this adjustment the feed dog 2 would be in engagement with the fabric section a shorter interval of time than the feed dog 1. The backward movement of the feed dogs begins substantially at the time when the feed dog 1 crosses the plane of the throat plate and the backward movement of the feed dogs ceases substantially at the time when the feed dog 1 again crosses the plane of the throat plate on its downward movement. It will thus be seen that under the adjustment just stated, the feed dog 1 will have a longer interval of feeding movement than the feed dog 2. The needle is disposed substantially in front of the feed dog 2, and therefore, the fabric section will be fed to the needle a little faster than it is fed away from the needle. This is the well known differential feeding movement on the fabric.

By adjusting the position of the shaft 25 which carries the arm 24 the sleeve 21 may be raised or lowered. When it is raised then the end of the lever carrying the feed dog 2 is lowered, and when it is lowered, then the end of the lever carrying the feed dog 2 is raised. This provides a convenient way of varying the effective differential feeding action of the feed dog 2.

The cloth plate is indicated in the drawings at 29, and mounted on the cloth plate is the usual throat plate 30. The needle bar 31 carries a needle 32 which is disposed so as to pass through the fabric section in front of the feed dog 2. The fabric is held on the throat plate by a presser foot 33 which is carried by a presser lever 34.

From the above, it will be noted that I have provided a feeding mechanism which consists of few parts which are directly operated from an actuating shaft so that they may be driven at comparatively high speed. The feeding mechanism although capable of imparting a differential feeding movement accomplishes this result solely by devices which operate through a single feed bar on which both the feed dogs are mounted. Not only is the mechanism for actuating the feed dogs to impart a differential movement thereto a very simple mechanism, but it may also be readily adjusted for varying the effective differential feeding.

It is obvious that minor changes in the details of construction and the arrangement of parts may be made without departing from the spirit of the invention as set forth in the appended claims.

Having fully described my invention, what I claim as new and desire to secure by Letters Patent, is:—

1. A feeding mechanism for sewing machines comprising a feed bar, a feed rocker to which said feed bar is pivoted, a main actuating shaft located above the feed bar and in a line at an acute angle to the line of feed, an eccentric, an eccentric strap cooperating therewith and connected to said feed rocker for oscillating the same, a second eccentric, an eccentric strap cooperating therewith and connected to said feed bar for raising and lowering the same, a feed dog fixed to said feed bar, a lever pivoted on said feed bar, a feed dog fixed to said lever, a guiding member having an operating slidable engagement with said lever and causing said lever to swing as the feed bar is raised and lowered for imparting a differential rising and falling movement to the feed dog carried by the feed lever.

2. A feeding mechanism for sewing machines comprising a feed bar, means for moving said feed bar back and forth, means for raising and lowering the feed bar, a feed dog fixed to the feed bar, a lever pivoted intermediate its ends to said bar, a feed dog mounted on one end of said lever, a guiding member engaging the other end of said lever, and freely slidable thereon during the raising and lowering and back and forth movement of the feed bar, and means for supporting said guiding member.

3. A feeding mechanism for sewing machines comprising a feed bar, a feed rocker to which said feed bar is pivoted, means for oscillating the feed rocker, means for raising and lowering the feed bar, a feed dog fixed to the feed bar, a lever pivoted intermediate its ends to the feed bar, a feed dog fixed to said lever, a guiding member slidingly engaging the end of the lever, and stationary means for pivotally supporting said guiding member.

4. A feeding mechanism for sewing machines comprising a feed bar, a feed rocker to which said feed bar is pivoted, means for oscillating the feed rocker, means for raising and lowering the feed bar, a feed dog fixed to the feed bar, a lever pivoted intermediate its ends to the feed bar, a feed dog fixed to said lever, a guiding member slidingly engaging the end of the lever, stationary means for pivotally supporting said guiding member, and means for raising and lowering said stationary means.

5. A feeding mechanism for sewing machines comprising a feed bar, a feed rocker to which said feed bar is pivoted, means for oscillating said feed rocker, means for raising and lowering the feed bar, a feed dog fixed to said feed bar, a feed lever pivoted on said feed bar, a feed dog fixed to said lever, a sleeve slidingly engaging the end of said lever, and an arm held in fixed position on which said sleeve is pivotally mounted.

6. A feeding mechanism for sewing machines comprising a feed bar, a feed rocker to which said feed bar is pivoted, means for oscillating said feed rocker, means for raising and lowering the feed bar, a feed dog fixed to said feed bar, a feed lever pivoted on said feed bar, a feed dog fixed to said lever, a sleeve slidingly engaging the end of said lever, an arm held in fixed position on which said sleeve is pivotally mounted, and means for adjusting the position of said arm.

7. A feeding mechanism for sewing machines comprising a feed bar, a feed dog carried thereby, means for moving said feed bar back and forth, means for raising and lowering said feed bar, a second feed dog, a support for said second feed dog carried by said feed bar and movable relative to said feed bar so as to permit said second feed dog to be raised and lowered relative to the first-named feed dog, devices carried by a stationary element of the machine and having an operative movable engagement with said support, said devices being disposed and arranged whereby the movements imparted to the feed bar will cause said second feed dog to be moved in an orbit of a different character than the orbit of the first-named feed dog.

8. A feeding mechanism for sewing machines comprising a fed bar, a feed dog carried thereby, means for moving said feed bar back and forth, means for raising and lowering said feed bar, a second feed dog, a support for said second feed dog carried by said feed bar and movable relative to said feed bar so as to permit said second feed dog to be raised and lowered relative to the first-named feed dog, devices carried by a stationary element of the machine and having an operative slidable engagement with said support, said devices being disposed and arranged whereby the movements imparted to the feed bar will cause said second feed dog to be moved in an orbit of a different character than the orbit of the first-named feed dog.

9. A feeding mechanism for sewing machines comprising a feed bar, a feed dog carried thereby, means for moving said feed bar back and forth, means for raising and lowering said feed bar, a second feed dog, a support for said second feed dog carried by said feed bar and movable relative to said feed bar so as to permit said second feed dog to be raised and lowered relative to the first-named feed dog, devices carried by a stationary element of the machine and having an operative movable engagement with said support, said devices being disposed and arranged whereby the movements imparted to the feed bar will cause said second feed dog to be moved in an orbit of a different character than the orbit of the first-named feed dog, and means for moving said devices to various positions whereby the orbit of said second feed dog may be varied.

10. A feeding mechanism for sewing machines comprising a feed bar, a feed dog carried thereby, means for moving said feed bar back and forth, means for raising and lowering said feed bar, a second feed dog, a support for said second feed dog carried by said feed bar and movable relative to said feed bar so as to permit said second feed dog to be raised and lowered relative to the first-named feed dog, devices carried by a stationary element of the machine and having an operative slidable engagement with said support, said devices being disposed and arranged whereby the movements imparted to the feed bar will cause said second feed dog to be moved in an orbit of a different character than the orbit of the first-named feed dog, and means for moving said devices to various positions whereby the orbit of said second feed dog may be varied.

In testimony whereof, I affix my signature.

FREDERICK F. ZEIER.